July 11, 1967   R. W. MacDONNELL   3,330,435
JOURNAL BOX FRONT SEAL
Filed Jan. 22, 1965
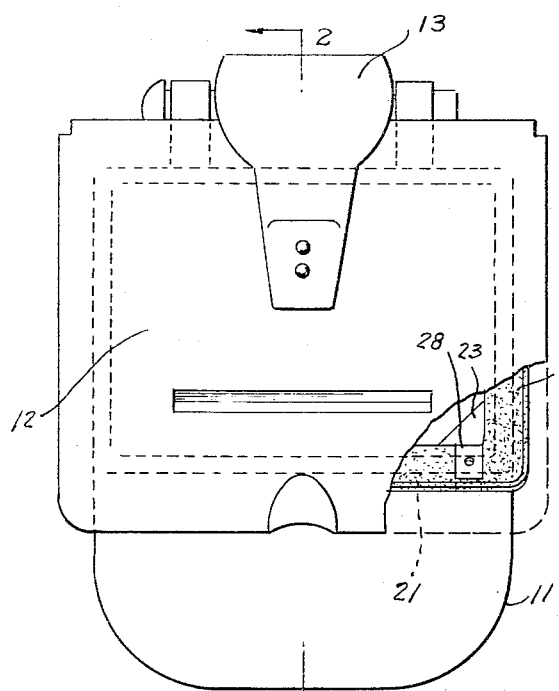
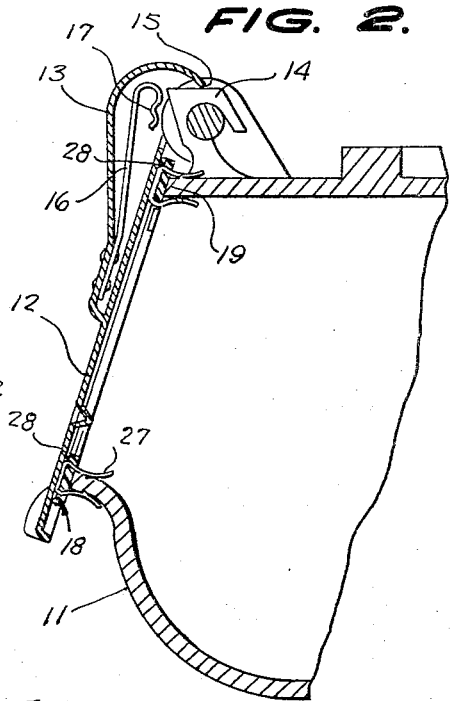
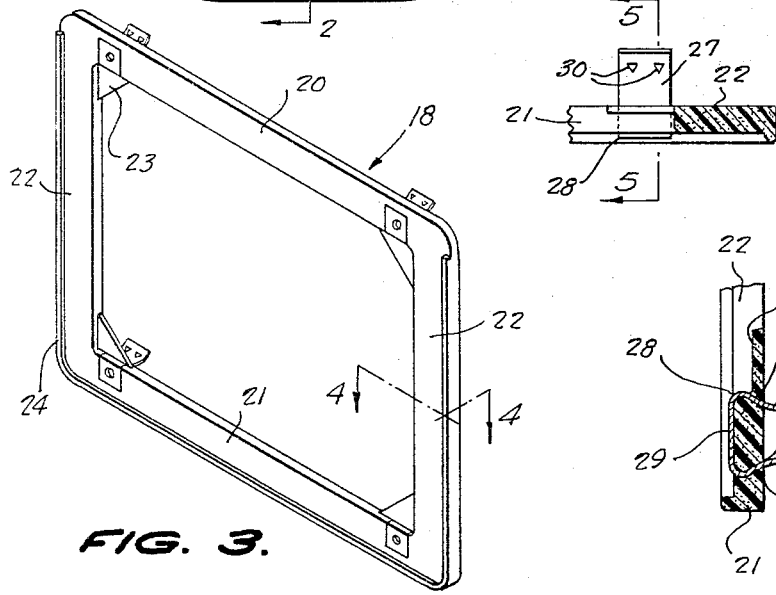
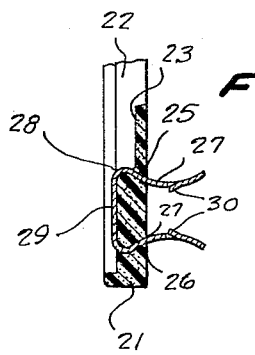
INVENTOR.
ROBERT W. MAC. DONNELL,
BY
Berman, Davidson & Berman
ATTORNEYS.

3,330,435
JOURNAL BOX FRONT SEAL
Robert W. MacDonnell, 525 Craig Ave.,
Crete, Ill. 60417
Filed Jan. 22, 1965, Ser. No. 427,442
2 Claims. (Cl. 220—46)

ABSTRACT OF THE DISCLOSURE

A generally rectangular flat resilient gasket frame to fit on the rim of a journal box, the frame having pairs of slits, with the legs of respective U-shaped resilient retaining clips engaged through the slits, the legs defining short-radius corner bends relative to the associated clip bight portions, the legs being outwardly concave and lockingly-securing the material of the frame between the corner bends of the clips, the legs being formed at their concave intermediate portions with inwardly-directed gripping prongs lockingly-engageable with the rim of a journal box received between the legs.

---

This invention relates to gasket devices for railroad journal box covers, and more particularly to an improved gasket unit adapted to be secured on the rim of a journal box opening.

A main object of the invention is to provide a novel and improved journal box lid sealing assembly adapted to fit on the rim of a journal box and to be retained thereon, said assembly involving simple components, being easy to install and providing a tight and reliable seal between the rim of the journal box and the associated lid.

A further object of the invention is to provide an improved gasket device adapted to be mounted on the rim of a journal box opening so as to cooperate with the associated journal box lid to form a moisture-tight seal when the lid is closed, the gasket device involving inexpensive components, being durable in construction, being provided with retaining means so that it will not be readily shaken loose by vibration or shock, and suffering minimum deterioration from exposure to adverse atmospheric conditions.

A still further object of the invention is to provide an improved gasket device in the form of a frame adapted to fit on the rim of a journal box opening, said gasket device being provided with improved clip means for retaining same on the rim, the gasket device being locally reinforced adjacent the clip devices so that said clip devices will be securely held in the gasket device with sealing contact, and the clip devices being provided with spur means for lockingly interengaging with the adjacent surfaces of the walls of the associated journal box.

Further objects and advantages of the invention will become apparent from the following description and claims, and from the accompanying drawings, wherein:

FIGURE 1 is an elevational view, partly broken away, of a railroad journal box provided with an improved lid seal constructed in accordance with the present invention.

FIGURE 2 is a vertical cross sectional view taken substantially on the line 2—2 of FIGURE 1.

FIGURE 3 is a perspective view of the gasket assembly employed in FIGURES 1 and 2.

FIGURE 4 is an enlarged fragmentary cross sectional view taken substantially on the line 4—4 of FIGURE 3.

FIGURE 5 is a cross sectional view taken substantially on the line 5—5 of FIGURE 4.

Referring to the drawings, 11 designates a conventional railway journal box provided with a hinged lid 12 which is biased toward closed position by a leaf spring member 13 secured to the lid and engageable with a cam-shaped lug member 14, the edge 15 of the spring engaging the top surface of the lug member when the lid is in closed position, whereby biasing tension is developed in the leaf spring 13 which is transferred to the lid 12 to bias the lid toward closed position. When the lid is opened, the edge 15 slides past the rear corner of the lug 14, for example, when the lid 12 is rotated in a clockwise direction from the position thereof shown in FIGURE 2, releasing the biasing spring 13. A retaining leaf spring 16 is secured to the lid, said spring 16 being provided with a corrugated free end portion 17 which cooperates with the lug 14 to releasably hold the lid 12 in an open position.

The above described hinged lid structure is conventional per se and forms no part of the present invention.

Designated generally at 18 is an improved lid seal assembly according to the present invention adapted to be secured on the rim 19 of the journal box 11 and adapted to be sealingly engaged by the lid 12 when the lid is in closed position. The lid seal assembly 18 comprises a relatively wide band of compressible resilient deformable material, such as neoprene foam having a closed cellular texture and having imperforate skin-like surfaces. The band is in the form of a generally rectangular closed frame having the longitudinal arms 20 and 21 and the transverse arms 22, 22. Integrally formed at the inside corners of the rectangular frame are triangular webs 23 of reduced thickness which serve as corner-strengthening means for the frame. The rectangular frame is further provided with a sealing rib 24 which extends along the outer edges of the transverse arms 22, 22 and along the outer edge of the lower longitudinal arm 21.

The longitudinal arms 20, 21 are formed with respective pairs of parallel slits 25, 26 adjacent the corner webs 23, said slits extending parallel to the respective arms 20, 21. Engaged through the respective pairs of parallel slits 25 and 26 are the legs 27 of respective U-shaped spring clips 28, said legs being arcuately curved, as shown in FIGURE 5, and being outwardly concave, as illustrated, defining relatively short-radius corner bends with respect to the bight portions of the clips and being in close sealing contact with the surfaces of the slits 25 and 26, the bight portion 29 of each clip being likewise in close sealing contact with the associated longitudinal arm 20 or 21 between said corner bends, the portions of the band between said corner bends being lockingly-confined therebetween. The legs 27, 27 are provided with inwardly struck, generally triangular sharp inclined retaining prongs 30, said prongs extending toward the bight portions 29 of the clips and being adapted to lockingly interengage with the relatively rough surfaces of the walls of a journal box 11 adjacent the rim portion thereof. Thus, the journal box 11 is generally a relatively rough casting having surfaces which are relatively irregular, so that the points of the prongs 30 are lockingly engageable with surface indentations of the journal box walls.

The gasket assembly 18 is shaped to fit on the rim 19 of a journal box, extending continuously around the rim, with the clips 28 engaged over the rim in the manner illustrated in FIGURE 2, whereby the generally rectangular gasket frame is securely held on the journal box rim. Said gasket frame is thus supported on the rim in a position to be sealingly engaged by the inside surface of the journal box lid 12 when said lid is in closed position, as shown in FIGURE 2.

As will be apparent from FIGURE 2, the biasing spring 13 exerts a biasing force on the lid 12 which tends to press the lid against a resilient deformable gasket assembly frame, thus assuring good sealing contact of the lid with the gasket assembly. It will be further apparent that the clips 28 hold the rectangular sealing frame in place on the rim of the journal box opening at all times, so that the sealing frame will not drop off when the lid 12 is opened.

Because of the outwardly concave curvature of the clip legs 27, it is easy to force the clips onto the rim 19, and since the prongs 30 project inwardly in the manner illustrated in FIGURE 5 and are directed toward the bight portion 29, they easily interlock with the rough surfaces of the walls of the journal box surrounding the journal box opening.

While a specific embodiment of an improved journal box lid sealing assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A journal box lid seal comprising a relatively wide band of compressible resilient deformable material forming a generally rectangular frame corresponding substantially to the lift-fitted opening of a journal box to which it is to be applied, and U-shaped clips sealingly engaged through the band at the respective corner portions thereof, each having a pair of resilient outwardly concave legs defining relatively short radius corner bends and extending from the band substantially perpendicular to the plane thereof and transverse thereto and arranged to receive the rim of a journal box opening and to frictionally engage the opposite surfaces of the walls of the journal box adjacent said rim, said band being formed with respective pairs of parallel slits spaced to receive the legs of the clips with the bight portions of the clips closely-engaging the regions of the band between the pairs of slits, said band regions being lockingly-confined between the corner bends of the clips.

2. A journal box lid seal comprising a relatively wide band of compressible resilient deformable material forming a generally rectangular substantially flat frame corresponding substantially to the lid-fitted opening of a journal box to which it is to be applied, an outwardly-projecting sealing rib integrally-formed on and extending along one longitudinal outer edge and the outer edges of the opposite sides of the band, said band being formed with triangular webs at its corner portions and with respective pairs of parallel slits adjacent said webs extending through and parallel to the longitudinal sides of said generally rectangular frame, and U-shaped clips sealingly engaged through the slits, each having a pair of outwardly concave resilient legs defining relatively short-radius corner bends and extending from the band substantially perpendicular to the plane thereof and transverse thereto and arranged to receive the rim of a journal box opening and to frictionally engage the opposite surfaces of the walls of the journal box adjacent said rim, the regions of the band between the pairs of slits being lockingly-confined between the opposite pairs of corner bends of the clips, said legs being provided at their concave intermediate portions with inwardly struck inclined sharp retaining prongs directed toward the bight portions of the associated clips and adapted to interlock with said surfaces.

References Cited

UNITED STATES PATENTS

| 2,871,068 | 1/1959 | Wright | 308—44 |
| 3,096,987 | 7/1963 | Hennessy | 277—132 X |
| 3,200,448 | 8/1965 | Bright | 49—491 |

SAMUEL ROTHBERG, *Primary Examiner.*